W. L. PAUL.
LIFTING MEANS FOR RIDING CULTIVATORS.
APPLICATION FILED AUG. 10, 1911.
1,010,170.
Patented Nov. 28, 1911.
2 SHEETS—SHEET 2.
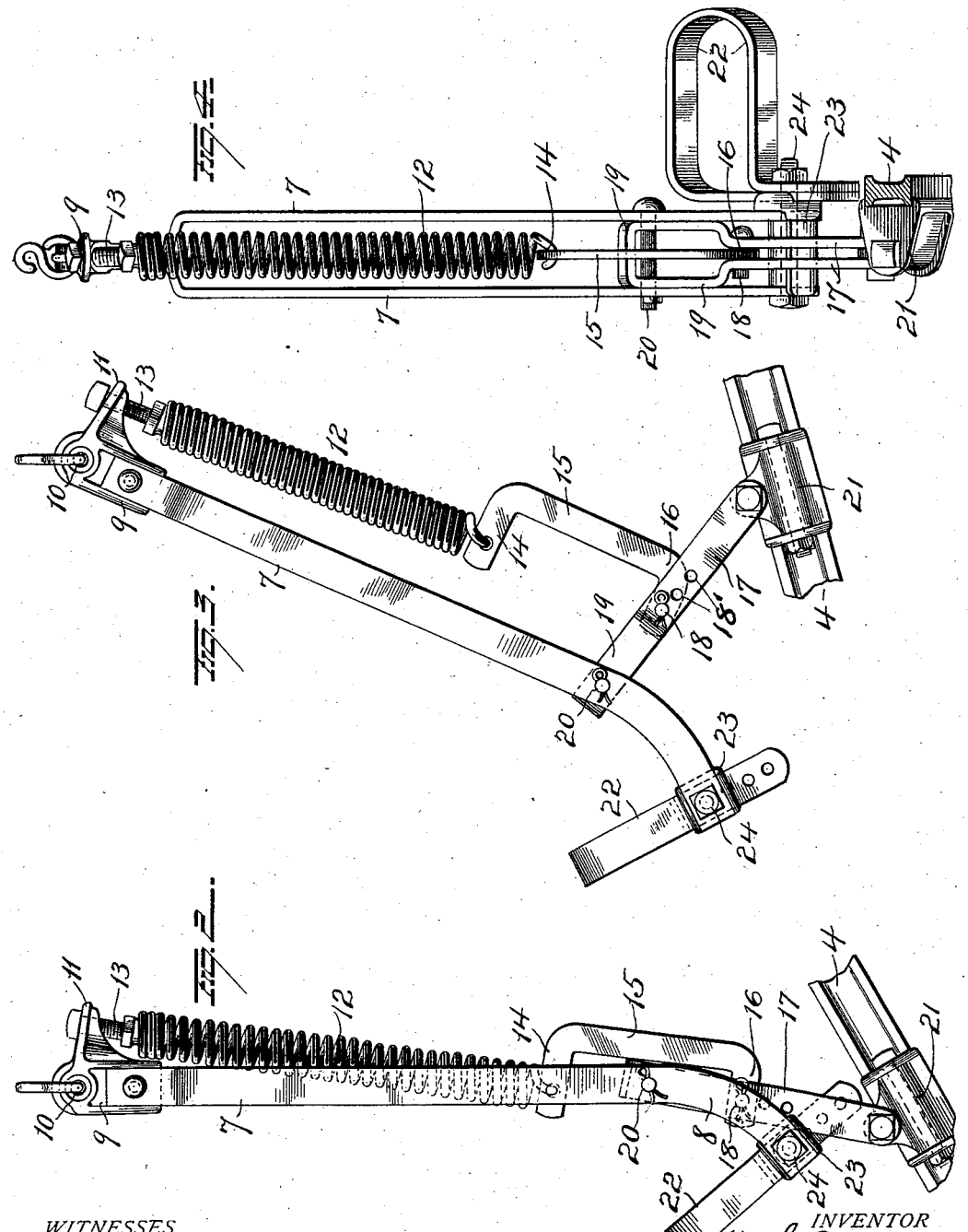
WITNESSES
INVENTOR
Wm L. Paul
By F. A. Seymour
Attorney

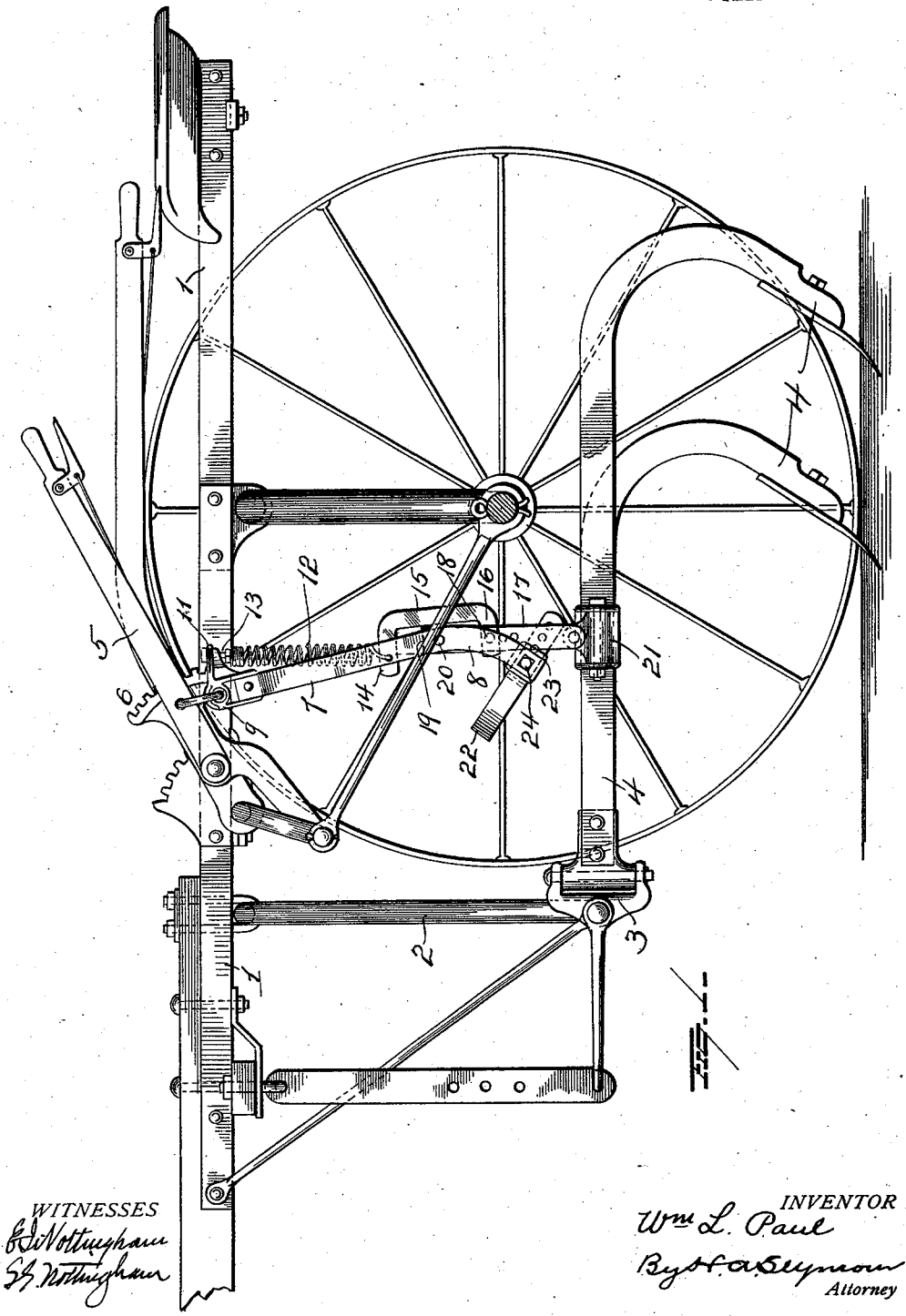

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

LIFTING MEANS FOR RIDING-CULTIVATORS.

1,010,170.     Specification of Letters Patent.     Patented Nov. 28, 1911.

Application filed August 10, 1911. Serial No. 643,423.

*To all whom it may concern:*

Be it known that I, WILLIAM L. PAUL, a citizen of the United States, residing at South Bend, in the county of St. Joseph and State of Indiana, have invented certain new and useful Improvements in Lifting Means for Riding-Cultivators; and I do hereby declare the following to be a full, clear, and exact description of the invention, such as will enable others skilled in the art to which it appertains to make and use the same.

This invention relates to lifting means for riding cultivators, the object of the invention being to provide devices for normally holding the shovel gang to its work, said devices being so constructed and arranged that they can be quickly tripped by the operator to release a spring which acts quickly to raise the shovel gang clear of trash or other obstructions.

A further object is to so construct the devices that they can be locked by foot pressure on a stirrup; with the lifting spring under tension and the shovel gang down to its work, and so that they can be quickly unlocked by foot pressure against the same stirrup to free the spring and permit it to lift the shovel gang.

With these and other objects in view, the invention consists in certain novel features of construction and combinations of parts as hereinafter set forth and pointed out in the claims.

In the accompanying drawings, Figure 1 is a side elevation of a cultivator showing the application of my improvements thereto. Fig. 2 is an enlarged side elevation of the tripping devices and lifting spring with the parts in locked position. Fig. 3 is a similar view showing the unlocked positions of the parts; and Fig. 4 is an enlarged front elevation of the tripping devices and lifting spring.

My improvements are applicable to wheeled cultivators of various types employing shovel gangs, but I have illustrated an embodiment of my invention on a cultivator such as disclosed in my Patent No. 893,361 issued July 14th, 1908.

1 represents the framework of the wheeled cultivator, provided with depending members 2, with the lower ends of which, brackets 3 are pivotally connected. With these brackets, the forward ends of the beams of shovel gangs 4 are connected,—the pivotal support of the brackets 3 permitting vertical movement or raising of the cultivator gang.

In the drawing, I have shown a single shovel gang, but it will of course be understood that a plurality of shovel gangs will be employed, and that devices such as hereinafter described for controlling the raising and lowering thereof, will be employed for each shovel gang.

A lever 5 is mounted on the framework and provided with a detent to coöperate with a segment 6. This lever is connected with the shovel gang by means of my improved trip devices as presently explained, and can be operated to raise and lower the shovel gang.

Heretofore, it has been the practice to connect the lifting lever with the shovel gang by means of a flexible device, such as a chain as shown in my patent hereinbefore referred to, and in some instances, part of the weight of the shovel gang has been sustained by a lifting spring which detracts from the otherwise penetrating qualities of the shovel gang. My present invention provides means whereby foot pressure lowers the gang to its work against the pull of a spring, and then locks the spring (while under tension), so that when said spring is freed, it will operate to raise the gang.

My improvements comprise parallel bars 7, curved forwardly at their lower ends, as at 8 and terminating somewhat above the shovel gang. The bars 7 are connected at their upper ends and have a bracket 9 secured thereto, said bracket being provided with a hole 10 to receive a connecting device by means of which it is pivotally connected with the lifting lever 5. The bracket 9 is also provided with a lateral arm 11, with which the upper end of a lifting spring 12 is connected by means of a bolt 13. The lower end of the spring 12 is connected with the upper arm 14 of a yoke 15, and the lower arm 16 of this yoke is pivotally connected between parallel bars 17, as at 18. The bars 17 are provided each with a plurality of holes 18$^a$ to permit attachment of the yoke therewith to be adjusted. The bars 17 can be conveniently formed by a single piece of metal bent upon itself,—the upper portions of said bars 17 being spread apart to form a yoke 19 disposed between the long bars 7 somewhat above the curved lower ends of the latter and pivotally connected thereto, as at 20. The lower ends of the bars 17 extend downwardly from their pivotal connection with the yoke 15 and are pivoted to a bracket 21 secured to the shovel gang.

To the curved lower ends of the long bars 7, a stirrup 22 is secured by means of a clamp 23 and a bolt 24, and the arm of the stirrup is provided with a plurality of holes to permit it to be adjustably secured to the bars 7.

When the parts are in the positions shown in Fig. 2, the yoke 19 at the upper ends of the bars 17 will bear against the yoke 15 (the latter thus acting as a stop) and the pivotal connection 20 will be out of line with the pivotal connection 18 at the lower end of yoke 15 and the connection of the spring 12 with the upper arm of said yoke 15. The spring 12 will be thus locked under tension and a connection will be formed between the shovel gang and the lifting lever 5. The shovel gang can now be raised by means of the lever 5 and locked in any desired raised position by engagement of the detent on said lever with the segment 6.

When it is desired that the gang shall be quickly raised to avoid trash or other obstruction, the operator will apply foot pressure to the stirrup 22 so as to swing the long bars 7 and move the pivotal connection at 20 in a direction away from the yoke or stop 15 until said pivotal connection 20 will move past alinement with the pivotal connection at 18 and the spring connection at the upper end of yoke 15. The spring 12 will thus be unlocked or released and will operate to raise the shovel gang. Foot pressure being again applied to the foot stirrup, the shovel gang will be lowered and the parts locked (as in Fig. 2) with the spring 12 under tension.

Having fully described my invention what I claim as new and desire to secure by Letters-Patent, is:—

1. The combination with a wheeled frame and a beam provided with a soil-engaging member, of a lever on the frame, a lifting spring and foot-operated trip devices connecting said spring with the beam and with said lever and normally locking the spring under tension when the soil-engaging member is in working position.

2. The combination with a wheeled frame and a shovel gang, of a lever on the frame, jointed bars connecting said lever with the shovel gang and constituting a normal connection between said lever and shovel gang, a spring connected with said jointed bars and normally held under tension thereby, and foot-operated means for tripping said jointed bars and releasing the tension of the spring to raise the shovel gang.

3. The combination with a wheeled frame and a shovel gang, of an upper bar connected with said frame, a foot operated member secured to said bar, a lower bar connecting said upper bar with the shovel gang, a spring connected with said upper bar, and a member connecting said spring with the lower bar at a point below the pivotal connection between said upper and lower bars.

4. The combination with a wheeled frame and a shovel gang, of an upper bar depending from said frame, a foot-operated member secured to the lower end of said upper bar, a lower bar attached to the shovel gang and pivotally with the upper bar above the lower end of the latter, a yoke pivoted to the lower bar and extending above the pivotal connection of said bars with each other, and a spring connected at one end with the upper end of said yoke and at its upper end with the upper bar.

5. The combination with a wheeled frame and a shovel gang, of connecting devices between the wheeled frame and the shovel gang, said connecting devices comprising an upper member connected with the frame, a foot operated device secured to the lower portion of said upper member, a lower member pivoted to the upper member above the foot operated device and connected at its lower end with the shovel gang, an intermediate member pivotally connected with the lower member and constituting a stop for the latter, and a spring connected with the upper end of the intermediate member and with the upper member.

6. Connecting and raising devices for shovel gangs, comprising a lower member adapted for attachment to a shovel gang, a yoke adjustably connected at one end with said lower member, a spring connected at its lower end with the upper end of said yoke, a bracket with which the upper end of said spring is connected, an upper member secured to said bracket and pivotally connected with the lower member at a point intermediate the ends of said yoke, and a foot-operated device secured to said upper member at a point below its pivotal connection with the lower member.

In testimony whereof, I have signed this specification in the presence of two subscribing witnesses.

WILLIAM L. PAUL.

Witnesses:
 EDWIN NICAR,
 SIDNEY A. CRESSY.